United States Patent
Nguyen et al.

(10) Patent No.: US 7,107,493 B2
(45) Date of Patent: Sep. 12, 2006

(54) SYSTEM AND METHOD FOR TESTING FOR MEMORY ERRORS IN A COMPUTER SYSTEM

(75) Inventors: Vincent Nguyen, Houston, TX (US); Kevin G. Depew, Kingwood, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 607 days.

(21) Appl. No.: 10/348,228

(22) Filed: Jan. 21, 2003

(65) Prior Publication Data

US 2004/0143719 A1 Jul. 22, 2004

(51) Int. Cl.
  *G06F 11/00* (2006.01)
(52) U.S. Cl. .............. 714/42; 714/5; 714/36; 714/719; 714/718; 714/6; 714/7; 713/1
(58) Field of Classification Search .......... 714/5, 714/7, 36, 42, 719
See application file for complete search history.

(56) References Cited

U.S. PATENT DOCUMENTS

| | | | | |
|---|---|---|---|---|
| 5,299,202 A | * | 3/1994 | Vaillancourt | 714/42 |
| 5,396,619 A | * | 3/1995 | Walton | 714/8 |
| 5,561,765 A | * | 10/1996 | Shaffer et al. | 714/42 |
| 5,748,879 A | * | 5/1998 | Kobayashi | 714/42 |
| 5,835,704 A | * | 11/1998 | Li et al. | 714/42 |
| 6,047,343 A | * | 4/2000 | Olarig | 710/302 |
| 6,173,346 B1 | | 1/2001 | Wallach et al. | |
| 6,247,079 B1 | | 6/2001 | Papa et al. | |
| 6,247,080 B1 | | 6/2001 | Wallach et al. | |
| 6,247,153 B1 | * | 6/2001 | Jeon et al. | 714/718 |
| 6,418,492 B1 | * | 7/2002 | Papa et al. | 710/302 |
| 6,487,623 B1 | * | 11/2002 | Emerson et al. | 710/302 |
| 6,550,023 B1 | * | 4/2003 | Brauch et al. | 714/42 |
| 6,671,645 B1 | * | 12/2003 | Maxham | 702/117 |
| 6,766,469 B1 | * | 7/2004 | Larson et al. | 714/7 |
| 6,802,023 B1 | * | 10/2004 | Oldfield et al. | 714/7 |
| 2002/0010875 A1 | * | 1/2002 | Johnson et al. | 714/5 |
| 2002/0042893 A1 | | 4/2002 | Larson et al. | |
| 2004/0068679 A1 | * | 4/2004 | Vellolil et al. | 714/42 |

OTHER PUBLICATIONS

Krontz et al., "Computer System Architecture With Hot Pluggable Main Memory Boards," U.S. Appl. No. 10/179,001, filed Jun. 25, 2002, 36 pp.

* cited by examiner

*Primary Examiner*—Bryce P. Bonzo
*Assistant Examiner*—Jack W. Szeto

(57) ABSTRACT

The specification may disclose a computer system that may operate a portion of available memory as backup to a primary memory, and the computer system may be adapted to test the backup memory for memory errors at times other than execution of power-on self-test procedures.

10 Claims, 2 Drawing Sheets

SYSTEM AND METHOD FOR TESTING FOR MEMORY ERRORS IN A COMPUTER SYSTEM

BACKGROUND

Computer systems may couple to the Internet, wide area networks (WANs) and/or local area networks (LANs). When coupled to networks in this fashion, a computer system may provide a variety of functions such as, without limitation, data storage, information handling, message routing, and on-line business transactions. Where a particular computer system may be providing a mission-critical service, such as an order processing for an on-line retailer, the computer system may implement redundancy of its hardware in order to sustain operation in spite of hardware failures.

One aspect of a computer system that may utilize duplicate or redundant hardware is main memory. Main memory may provide storage of data and instructions used by a processor. Main memory, which may comprise semiconductor devices, may suffer from correctable errors (i.e., errors that can be corrected and detected). Correctable errors may comprise changes in memory values caused by cosmic rays, transient hardware events, and the like. Correction of memory errors may be accomplished by use of error correction code (ECC) or other technology. However, main memory may also experience uncorrectable errors, which may not be correctable using ECC technology.

The occurrence of errors in main memory increases linearly with memory capacity. Thus, as memory capacity increases, the number of correctable and uncorrectable errors may likewise increase leading to an increased likelihood that the computer system may fail in some respect (e.g., complete system crash, undesirable system behavior). Computer systems may check main memory for errors during the power-on self test (POST) procedures. During POST procedures, the computer system may have yet to load an operating system, and thus may have the ability to thoroughly check each memory location within the main memory. Once an operating system and end-user programs are loaded and being executed, it may not be possible to check each main memory location for errors without unduly affecting operation of the computer or server system. The inability to check for memory errors in an operational computer system may lead to operational failures in unexpected situations.

Duplicate or redundant main memory may be referred to as "on-line" or "hot-spare" memory. Hot-spare memory thus may refer to main memory within a computer system that may be utilized if a primary memory experiences an uncorrectable memory failure, or experiences a series of correctable memory failures which may signal an impending uncorrectable memory failure. In this circumstance, the computer system may make the hot-spare memory the primary memory, thus allowing the faulty memory to be repaired and/or replaced. Some computer systems may have the ability to accept additional memory while the computer system is operational—hot-add memory—and such memory may be used immediately, or may be used as hot-spare memory.

While hot-spare memory may have been tested during POST procedures of the computer system, the memory may not be used in actual operation for weeks, or even months, and may experience failures prior to use. In the event that the computer system experiences a failure in a memory designated as "primary," a swap to the hot-spare memory with undetected failures may result in a computer system crash. Hot-add memory may not have been present in the computer system during POST procedures, and thus may not have been tested prior to becoming the primary memory in the system. Again, this may lead to the possibility that a swap to the spare memory may cause a computer system crash.

BRIEF DESCRIPTION OF THE DRAWINGS

For a detailed description of the embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF EMBODIMENTS OF THE INVENTION

The following discussion is directed to various embodiments of the invention. The embodiments disclosed should not be interpreted or otherwise used as limiting the scope of the disclosure, including the claims, unless otherwise specified. In addition, one skilled in the art will understand that the following description has broad application. The discussion of the embodiments is meant only to be exemplary, and not intended to intimate that the scope of the disclosure, including the claims, is limited to these embodiments.

Figure 1:
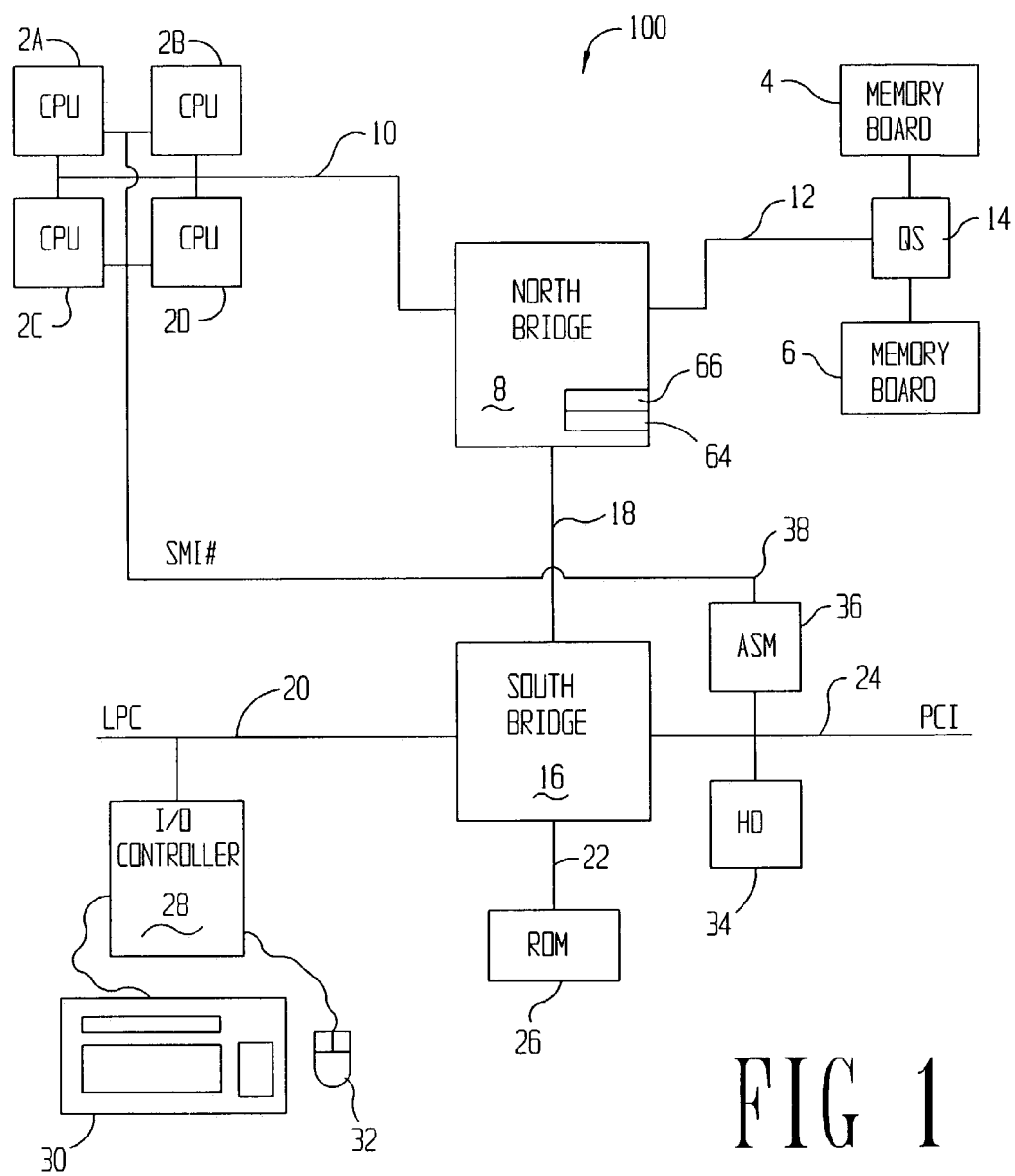
FIG. 1 illustrates a computer system constructed in accordance with embodiments of the invention.

Referring initially to FIG. 1, computer system 100 may comprise a plurality of central processing units (CPUs or processors) 2A–D coupled to a main memory, which may be implemented using memory arrays on one or more memory boards 4, 6. The processors 2 may couple to the memory array on each memory board 4, 6 by way of a bridge logic unit 8. In the exemplary computer system 100, the bridge logic unit 8 may be termed a "North Bridge" based on its location in computer system drawings. The processors may be of any suitable type, such as processors available from Intel Corporation (e.g., Intel® Pentium® 4 XEON processors, or an Itanium™ processors), AMD, or Motorola. The processors 2 may couple to the North Bridge 8 by way of a suitable bus 10, which may be a single bus (as illustrated), a split bus, or individual buses. The computer system 100 may implement only a single processor, if desired.

The memory arrays on memory boards 4, 6 may couple to the North Bridge 8 through a memory bus 12. North Bridge 8 may comprise a memory control unit (not specifically shown) that controls transactions to the main memory by sending control signals during memory accesses. The main memory may function as the working memory for the processors 2 and may comprise, on each memory board, a conventional memory device or array of memory devices in which programs, instructions and data may be stored. Thus, memory boards 4, 6 may each contain a suitable type of memory, such as dynamic random access memory (DRAM) or any other various types of DRAM devices such as synchronous DRAM (SDRAM), extended data output DRAM (EDO-DRAM), double-data-rate SDRAM (DDR SDRAM), and the like. In at least some of the embodiments of the invention, however, the main memory is implemented using DDR SDRAM packaged in dual in-line memory modules (DIMMs). The memory on each DIMM may be organized into a plurality of memory banks, with memory locations within each memory bank accessed on a row and column basis.

The memory boards 4, 6 may be selectively removed and added to the computer system without requiring the computer system to shut down. Quick switch device 14 may selectively couple and decouple an address bus, data bus, control signals, and power signals to each of the memory boards 4, 6. In particular, prior to removal of one of the memory boards, the quick switch device 14, possibly in combination with other devices, may electrically decouple address, data, control and power signals from the memory board to be removed. Likewise, after insertion of a memory board into the computer system 100, the quick switch device 14, possibly in combination with other devices, may provide power to the newly inserted memory board, and at appropriate times thereafter, couple the address bus, data, and control signals to the newly inserted memory board. Co-pending patent application Ser. No. 10/179,001 filed Jun. 25, 2002 titled "Computer System Architecture with Hot Pluggable Main Memory Boards," incorporated by reference herein as if reproduced in full below, may describe computer systems having the ability to accept hot-pluggable main memory boards.

The computer system 100 illustrated in FIG. 1 may also comprise a second bridge logic device 16 that bridges a primary expansion bus 18 to various secondary expansion buses, such as a low pin count (LPC) bus 20, a read only memory (ROM) bus 22, and a peripheral component interconnect (PCI) bus 24. Although the computer system 100 illustrated in FIG. 1 only shows three secondary expansion buses, a variety of suitable secondary expansion buses may be implemented, such as PCI-X, EISA, AGP and the like. In a fashion similar to the naming of North Bridge 8, bridge device 16 may be referred to as a "South Bridge" based on its location in computer system drawings. In at least some embodiments of the invention, North Bridge 8 and South Bridge 16 may be part of a chipset produced by Server Works, Inc., such as the Grand Champion™ HE Chipset. In embodiments utilizing the Grand Champion HE Chipset, the primary expansion bus 18 may comprise a Thin Intermodule Bus (TIB) (which is a proprietary bus of Server Works, Inc.); however, the computer system 100 illustrated in FIG. 1 is not limited to any particular type of chipset, and thus the primary expansion bus 18 may comprise other suitable buses, such as a PCI bus, or a Hublink™ bus (which is a proprietary bus of the Intel Corporation).

Still referring to FIG. 1, a ROM device 26 may couple, by way of the ROM bus 22, to the South Bridge 16. The ROM 26 may store software programs executable by the processors 2. The programs on the ROM 26 may be basic input/output system (BIOS) commands, stackless code executed during power-on self-test (POST) procedures, as well as dedicated programs that are executed based on the issuance of system management interrupts (SMIs) by various computer system devices, discussed more fully below.

Still referring to FIG. 1, the computer system 100 may also comprise an input/output (I/O) controller 28, that may couple to the South Bridge 16 by way of the LPC bus 20. The I/O controller 26 may couple the keyboard 30, a mouse 32, and various other I/O devices (not specifically shown) to the computer system 100.

The computer system 100 may further comprise a hard disk or hard drive (HD) 34 that may couple to the South Bridge 16 by way of the PCI bus 24. While only a single hard disk 34 is illustrated in FIG. 1, there may be multiple hard disks operated as individual storage devices, or possibly in a redundant array of independent devices (RAID) configuration.

The computer system 100 may also comprise an advance server management (ASM) device 36. The ASM device 36 may be a microcontroller programmed to perform a variety of server management functions. Alternatively, the ASM device 36 may be an application-specific integrated circuit (ASIC), again which may be designed and constructed to perform server management functions. The ASM 36 may couple to the South Bridge 16, and remaining computer system components, by way of the PCI bus 24. In at least some of the embodiments of the invention, the ASM 36 may be responsible for issuing system management interrupts to the processors 2, possibly by asserting the SMI# signal line 38 coupled between the ASM 36 and the processors 2. Upon receiving a SMI, the processors 2 may temporarily suspend execution of the operating system and end-user programs, and execute system management programs (SMI routines). The system management programs may initially be stored on the ROM 26, but may be accessible to the processors 2 in a shadowed ROM area of the main memory (not specifically shown).

In computer systems implementing redundant main memory systems, one portion of the available memory, for example all the memory on a single memory board, may be designated as a "primary" memory for the computer system. During the error-free operation of the primary memory, the hot-spare memory may experience a memory failure, which was not present or was not detected during the POST procedures. If the computer system 100 changes the "primary" designation to the hot-spare memory containing previously undetected experiencing memory errors, the changeover may crash the computer system. Embodiments of this invention thus may periodically test the hot-spare memory, for example the memory on a hot-spare memory board. Likewise, embodiments of the invention may test the hot-spare memory just prior to a change of the "primary" designation to the hot-spare. In this way, if the hot-spare memory has experienced a memory failure, the computer system 100 may determine the failure prior to swapping from the "primary" memory, which may only be experiencing correctable errors, and thus could continue to be used.

Embodiments of the invention may also have the ability to receive hot-add memory. That is, it may be possible to insert additional memory, for example, in the form of an additional memory board, into the computer system while the computer system is operational—hot-add memory. In the hot-add memory case, the newly inserted memory may not have been present during POST procedures, and thus may not have been tested for memory errors. Much like the hot-spare case discussed above, after insertion of the hot-add memory, the computer system 100 may test the memory for errors. Once the hot-add memory board has been inserted, it may be used as a hot-spare memory, and thus embodiments of the invention also periodically continue to check the viability of the memory on the newly inserted board, and also may test just prior to a swap of the primary designation.

Embodiments of the invention may implement a thirty-two bit address bus. This may mean that a computer system 100 such as that illustrated in FIG. 1 may only have approximately four gigabytes of virtual address space. The virtual address space may be alternatively referred to as the directly addressable memory space or directly addressable memory area, and may represent the number of unique combinations of the states of the thirty-two bit bus, each combination addressing one location. At least some of the physical devices within the computer system 100 may utilize portions of the virtual address space, and as such, the entire virtual address space may not be dedicated to addressing main memory. For example, PCI devices such as hard disk 34 may have a series of registers or buffers that facilitate transfer of data, and these registers or buffers may be assigned addresses in the virtual address space. Likewise, the BIOS routines stored on the ROM 26 may be copied to a shadowed ROM area within the main memory, and these programs too may be addressed using addresses in the virtual address space. Remaining addresses in the virtual address space may be assigned to main memory; however, embodiments of the invention may utilize more main memory than may be directly addressed in the virtual address space. Embodiments of the invention may implement 16 gigabytes, 32 gigabytes, 64 gigabytes, and more, and in these situations the entire main memory may not be directly addressed. Using physical address expansion (PAE) mode techniques, which may selectively map portions (known as pages) of the main memory to the virtual address space, it may be possible for the operating system and end user programs to access main memory over that which may be directly addressable.

In the various embodiments of the invention, the North Bridge 8 may be responsible for maintaining memory mapping tables, and the like, to implement the PAE mode used by the operating system and end-user programs. Memory testing performed in accordance with embodiments of the invention, however, may be performed in a system management mode (SMI mode), as may be triggered by ASM 36 asserting signal line 38, and thus the testing may be transparent to the operating system. Using SMI mode allows testing of the memory without the help, or intervention, of the operating system, and thus is transparent to the operating system. While it may be possible to utilize PAE mode addressing techniques in the system management mode, SMI routines in accordance with embodiments of the invention may only address the directly addressable memory area, possibly to keep the SMI routines short, to reduce execution time.

Figure 2:
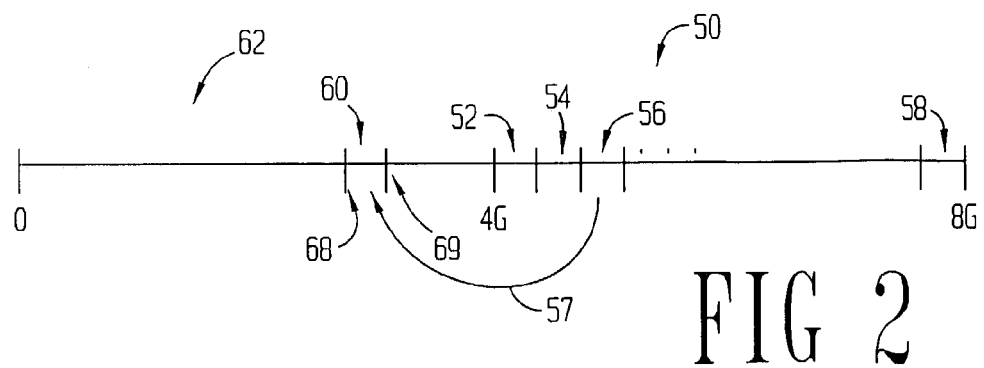
FIG. 2 illustrates a memory diagram that exemplifies memory mapping in accordance with embodiments of the invention.

Referring now to FIG. 2, embodiments of the invention may test for memory errors in the memory area above four gigabytes by mapping portions, for example portions 52, 54, 56 and 58 into a test region 60 in the directly addressable memory 62 (the mapping illustrated by arrow 57 with respect to portion 56). Each portion 52, 54, 56 and/or 58 may be mapped, possibly one portion at a time, to the region 60, and that portion of the memory may be tested for memory errors. The extent to which the memory is tested for errors may depend on the amount of processor time that may be dedicated to memory testing. In particular, if the computer system is relatively lightly loaded, it may be possible to perform detailed memory error testing procedures, such as walking zeros and/or walking ones in each memory location. If, however, the computer system is heavily loaded, and/or the amount of memory above the directly addressable memory space is large, the amount of time required to perform detailed memory tests by the processor in the SMI mode may adversely affect system performance. In such circumstances, embodiments of the invention may perform memory tests by less detailed means, for example by writing patterns to the memory, then reading the memory and comparing the pattern read to the pattern written. If the pattern read is the same as the pattern written, it may be assumed that the memory is still functioning correctly. These memory tests are merely exemplary of possible memory tests that may be performed, and may be used together or separately, possibly with other memory tests. Before proceeding it should be understood that the memory testing procedures described may be performed after POST procedures have complete, and during run-time of the computer system. Thus, the memory testing described is in addition to any memory testing that may take place during POST procedures.

Embodiments of the invention may implement the mapping and memory testing technique using a combination of programs executed during system management mode, as well as a plurality of registers in the North Bridge 8. Referring again to FIG. 1, North Bridge 8 may comprise two registers 64 and 66. Register 64 may contain an address of the starting location of the memory region 60, as illustrated by line 68 of FIG. 2. In at least some of the embodiments of the invention, the memory region 60 may be of known or predefined size, for example 32 kilo-bytes, and thus by reading the base address of the memory region, the addresses of the entire region may be calculated. Conversely, the base address register may identify an ending address of the region 60, as illustrated by line 69 in FIG. 2. In alternative embodiments, the North Bridge 8 may comprise an additional register (not shown) which contains an ending address of the region 60. In other embodiments of the invention, the starting address, ending address, or both, may be hard-coded in a memory testing program, thus negating the need for a register pointing to region 60.

North Bridge 8 may also comprise a register 66, which may contain a starting address of one of the memory portions in the memory area above four gigabytes. In particular, the register 66 may contain the starting (or alternatively ending) address of the memory portions 52, 54, 56 or 58. In embodiments where the size of the memory region 60 may be predefined, likewise the size of the memory area to be tested may be the same, and thus by reading the starting (or alternatively ending) address, the address of the entire portion may be calculated. In alternative embodiments, the North Bridge 8 may contain an additional register (not shown) that, used in combination with register 66, may define the beginning and ending address of the memory portion.

Figure 3:
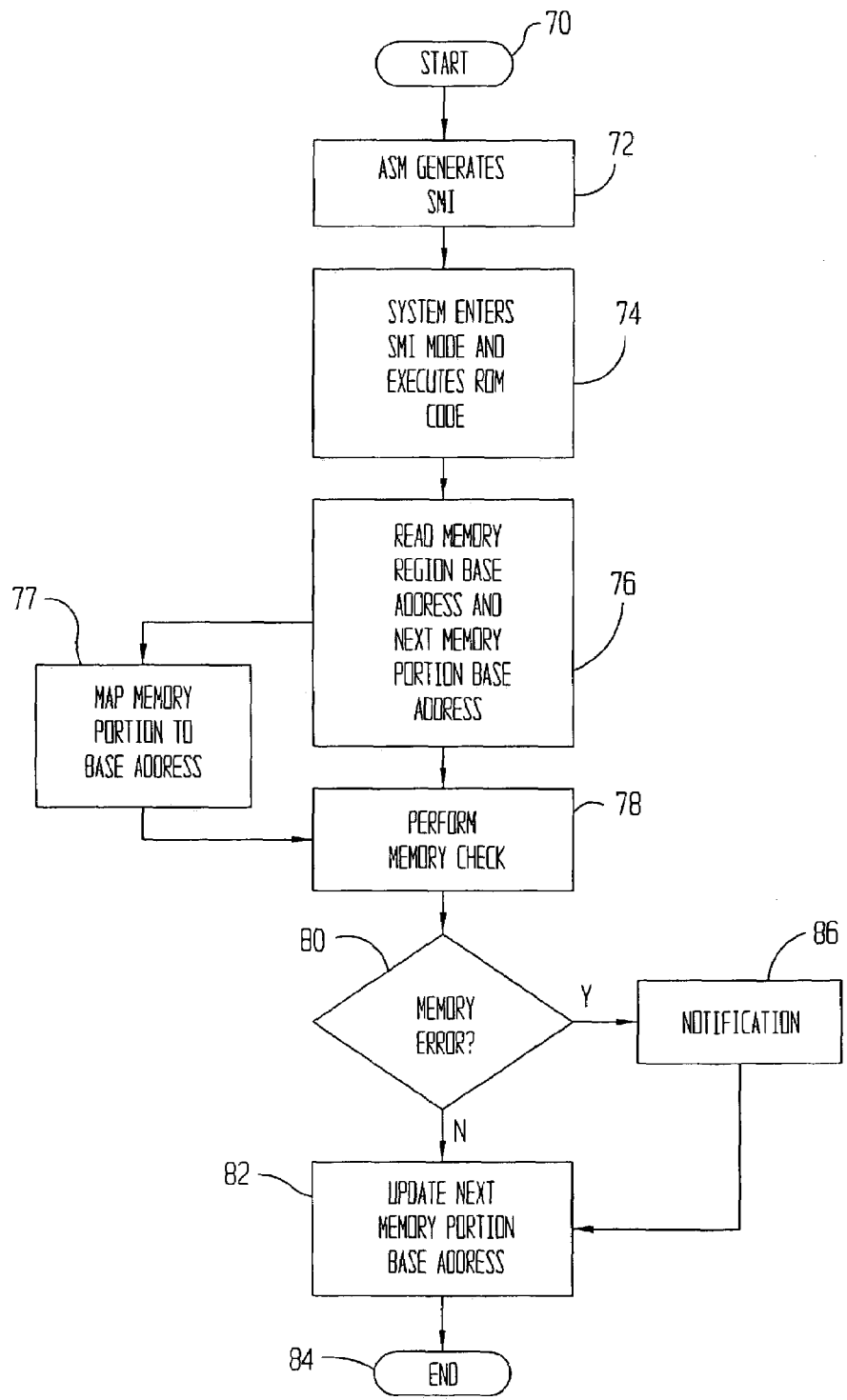
FIG. 3 illustrates a flow diagram for memory checking in accordance with embodiments of the invention.

FIG. 3 illustrates an exemplary flow diagram for checking for memory errors as may be utilized in accordance with embodiments of the invention. In particular, the process may start (block 70) and the ASM 36 may assert the SMI# signal line 38 (block 72). The ASM 36 may assert the signal line 38 periodically, for example, based on a pre-set or programmed timer, or may assert the signal line 38 responsive to an event within the computer system, such as insertion of a memory board or failure of a "primary" memory board. Upon receiving the system management interrupt, the processors 2 may temporarily suspend execution of the operating system and end-user programs, enter a system management mode, and execute a memory testing program (SMI routine) (block 74). The memory testing program, which in some embodiments may be stored on ROM 26 and executed from a ROM shadow region in the main memory (not specifically shown), may read an address of the memory region 60 from the register 64, and may likewise read an address for the memory portion to be checked from the register 66 (block 76). Utilizing those two pieces of information, the program may then request the North Bridge 8 to map the memory portion (block 77), for example memory portion 52, 54, 56 or 58, to the memory region 60, and then the memory testing program may perform a memory test (block 78).

As was discussed above, the memory testing complexity may range from simple to complex, depending on the impact to computer system performance that may be tolerated. If the memory test reveals no memory errors (block 80), the SMI program may update the memory register 66 with an address of the next memory portion to be tested (block 82) and the process may end (block 84). If, however, the program detects a memory error (block 80), a notification is made (block 86), and the process continues with updating of the register 66 (block 82). The type of notification may depend on the memory error encountered. If the SMI program identifies correctable errors, a computer system user or administrator may elect to leave the memory board in place, as the memory may still be operational and allow the computer system to function in the event that the primary memory experiences an uncorrectable failure. If the SMI program uncovers uncorrectable failures, the notification (block 86) may allow the system administrator or computer system user to immediately remove and replace the memory board with an operational memory board.

The above discussion is meant to be illustrative of the principles and various embodiments of the present invention. Numerous variations and modifications will become apparent to those skilled in the art once the above disclosure is fully appreciated. For example, the various embodiments of the invention discuss hot-spare memory implemented on a board-to-board basis; however, the hot-spare concept need not be implemented across multiple memory boards. That is, it may be possible to implement the hot-spare functionality across multiple DIMMs on a single memory board, or from bank-to-bank on a single DIMM. Thus, a bank operated as a hot-spare to a "primary" bank may reside either in the same DIMM, on a different DIMM yet still on the same memory board, or within a DIMM on another memory board. Further, testing of the hot-spare memory for memory errors of the embodiments of the invention discussed herein may use SMI routines in the system management mode, and as such the testing of the memory may be transparent to the operating system and end-user programs; however, it may be possible to program an end-user program to perform the testing, but such a system would not be transparent to the operating system, and may be operating system platform specific. It is intended that the following claims be interpreted to embrace all such variations and modifications.

What is claimed is:

1. A method comprising:
   operating a computer system comprising a first bank of memory utilized, at least in part, as primary memory of the computer system, and the computer system also comprising a second bank of memory utilized as a backup to the first bank of memory; and
   testing the second bank of memory for memory errors, the testing in a region outside a directly addressable memory space, after power-on self test procedures have completed, and during run-time, the testing comprising:
   mapping a test portion of the memory on the second bank of memory to a memory test region within the directly addressable memory space; and
   checking for bit errors on the test portion.

2. The method as defined in claim 1 wherein mapping further comprising:
   allocating a portion of the directly addressable memory space to the memory test region
   mapping the test portion to the memory test region; and
   repeating the mapping the test portion to the memory test region step for a plurality of portions of the memory on the second bank of memory.

3. The method as defined in claim 1 wherein checking for bit errors further comprises:
   writing a bit pattern to the best portion;
   reading a bit pattern from the test portion; and
   verifying the bit pattern read matches the bit pattern written.

4. A method comprising:
   operating a computer system comprising a first bank of memory utilized, at least in part, as primary memory of the computer system, and the computer system also comprising a second bank of memory utilized as a backup to the first bank of memory; and
   testing the second bank o memory for memory errors after power-on self test procedures have completed, and during run-time, the testing comprising:
   issuing a system management interrupt (SMI) signal; and
   executing a SMI routine to perform the testing step;
   reading a first register by the SMI routine, the first register identifies a test portion of the memory on the second bank of memory;
   mapping the test portion to the directly addressable memory space; and
   checking for bit errors in the test portion.

5. The method as defined in claim 4 further comprising:
   reading a second register by the SMI routine, the second register identifies a memory test region in a directly addressable memory space of the computer system; and
   wherein the mapping the test portion to the directly addressable memory space further comprises mapping the test portion to the memory test region.

6. The method as defined in claim 5 wherein each of the reading the register steps further comprising reading the first and second registers contained in a bridge logic device.

7. The method as defined in claim 4 further comprising updating the first register with an address of a next test portion.

8. A computer system comprising:
   a processor;
   a first memory bank and a second memory bank, the first memory bank used as a primary memory, and the second memory bank used as a hot-spare memory;
   a first bridge logic coupling the processor to the first and second memory banks, said first bridge logic comprising a test address register; and
   a system management device coupled to the processor, wherein the system management device periodically generates a system management interrupt (SMI) to the processor that invokes a SMI routine that tests for memory errors, wherein the SMI routine reads the test address register, and maps a portion of the memory of the second memory bank identified by the test address register to a test memory area in the directly addressable memory area;

wherein the computer system tests for memory errors in the second memory bank after power-on self test procedures, and during run-time of the computer system.

9. The computer system as defined in claim 8 further comprising:

said first bridge logic comprising a base address register; and wherein the SMI routine reads the base address register from the first bridge logic device to identify the test memory area.

10. A computer system comprising:

a means for executing programs;

a host bus coupled to the means for executing;

a first and second means for storing programs and data, the second means for storing utilized as a backup for the first means for storing, wherein the second means for storing is a region outside a directly addressable space;

a memory bus coupled to the first and second means for storing;

a primary expansion bus;

a first means for translating bus communication protocols coupling the memory bus, the host bus and the primary expansion bus, said first means for translating comprising a test address register; and a means for generating system management interrupts coupled to the means for executing;

wherein the means for generating periodically generates a system management interrupt (SMI) to the means for executing, the SMI invokes a SMI routine that tests for storage errors on the second means for storing, the testing after boot procedures, and during run-time of the computer system;

wherein the SMI routine reads the test address register from the first means for translating, and maps a portion of a storage area of the second means for storing identified by the test address register to a memory area in the directly addressable space to perform the testing for storage errors.

* * * * *

UNITED STATES PATENT AND TRADEMARK OFFICE
CERTIFICATE OF CORRECTION

| | | |
|---|---|---|
| PATENT NO. | : 7,107,493 B2 | Page 1 of 1 |
| APPLICATION NO. | : 10/348228 | |
| DATED | : September 12, 2006 | |
| INVENTOR(S) | : Vincent Nguyen et al. | |

It is certified that error appears in the above-identified patent and that said Letters Patent is hereby corrected as shown below:

In column 8, line 11, in Claim 2, after "region" insert -- ; --.

In column 8, line 18, in Claim 3, delete "best" and insert -- test --, therefor.

In column 8, line 28, in Claim 4, delete "o" and insert -- of --, therefor.

Signed and Sealed this

Twenty-first Day of April, 2009

JOHN DOLL
*Acting Director of the United States Patent and Trademark Office*